United States Patent [19]
Gertz et al.

[11] Patent Number: 5,646,602
[45] Date of Patent: *Jul. 8, 1997

[54] SWITCHING NETWORK FOR SELECTIVE PRODUCT DEMONSTRATION

[75] Inventors: Jonathan Gertz; James M. Tuomy, both of Lexington, Ky.

[73] Assignee: Audio Authority Corporation, Lexington, Ky.

[*] Notice: The term of this patent shall not extend beyond the expiration date of Pat. No. 5,422,631.

[21] Appl. No.: 496,903

[22] Filed: Jun. 29, 1995

Related U.S. Application Data

[63] Continuation of Ser. No. 176,152, Dec. 30, 1993, abandoned, which is a continuation-in-part of Ser. No. 783,849, Oct. 29, 1991, abandoned.

[51] Int. Cl.$^6$ ..................................................... H04Q 1/00
[52] U.S. Cl. ........................... 340/825.25; 340/825.24; 340/825.08; 381/77; 370/351
[58] Field of Search ............................ 340/825.22, 825.24, 340/825.25, 825.08; 381/57, 77, 81, 103, 123; 455/5.1, 6.3; 370/112

[56] References Cited

U.S. PATENT DOCUMENTS

| | | | |
|---|---|---|---|
| 3,582,964 | 6/1971 | Torick | 381/103 |
| 3,688,262 | 8/1972 | Liquori . | |
| 3,922,641 | 11/1975 | Gates, Jr. | 340/825.25 |
| 4,100,533 | 7/1978 | Napolitano et al. | 340/825.22 |
| 4,142,216 | 2/1979 | Goss . | |
| 4,156,866 | 5/1979 | Miller . | |
| 4,176,251 | 11/1979 | Odlen et al. | 381/123 |
| 4,232,231 | 11/1980 | Reed . | |
| 4,281,314 | 7/1981 | Hunt | 340/825.25 |
| 4,694,498 | 9/1987 | Suzuki | 381/103 |
| 4,755,792 | 7/1988 | Pezzolo | 340/825.25 |
| 5,212,833 | 5/1993 | Suda | 381/81 |

FOREIGN PATENT DOCUMENTS

| | | |
|---|---|---|
| 0380188 | 2/1987 | European Pat. Off. . |
| 0361585 | 9/1988 | European Pat. Off. . |

OTHER PUBLICATIONS

The OnSite System 4000 Generation, Product brochure, date of publication unknown.

Matrix System, Production Brochure, date of publication unknown.

The OnSite System, A Handbook for Installation, Operation and Service, date of publication.

Matrix Systems, A Handbook for Installation, Operation and Service, 2nd Printing, Oct. 1991.

*Primary Examiner*—Brian Zimmerman
*Attorney, Agent, or Firm*—King & Schickli

[57] ABSTRACT

A switching network for interconnecting selected products of different electronic groups on display for purposes of active demonstration includes a plurality of nodes. Each product on display is operatively connected to one node. Each node further includes a microcontroller. A bus operatively connects the microcontrollers together as well as the products on display. The bus allows two-way communication between the microcontrollers that supervise all network functions. Additionally, each of the nodes includes a product selector switch and cooperating relay for selectively activating an adjacent product connected to the node and an indicator lamp that when illuminated indicates that the corresponding electronic product is connected for active demonstration. The switching network also includes a switching noise suppression system, a novel circuit for operatively connecting the indicator lamp and a product selector switch of a node to a microcontroller utilizing only a single pair of conductors, an automatic volume calibration and sound pressure level limiting system and a theft detection system.

10 Claims, 9 Drawing Sheets

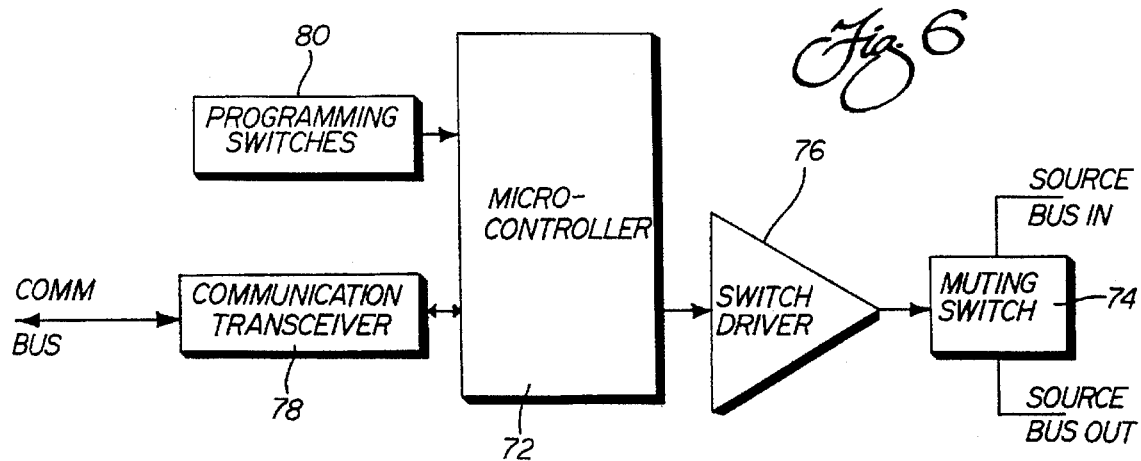
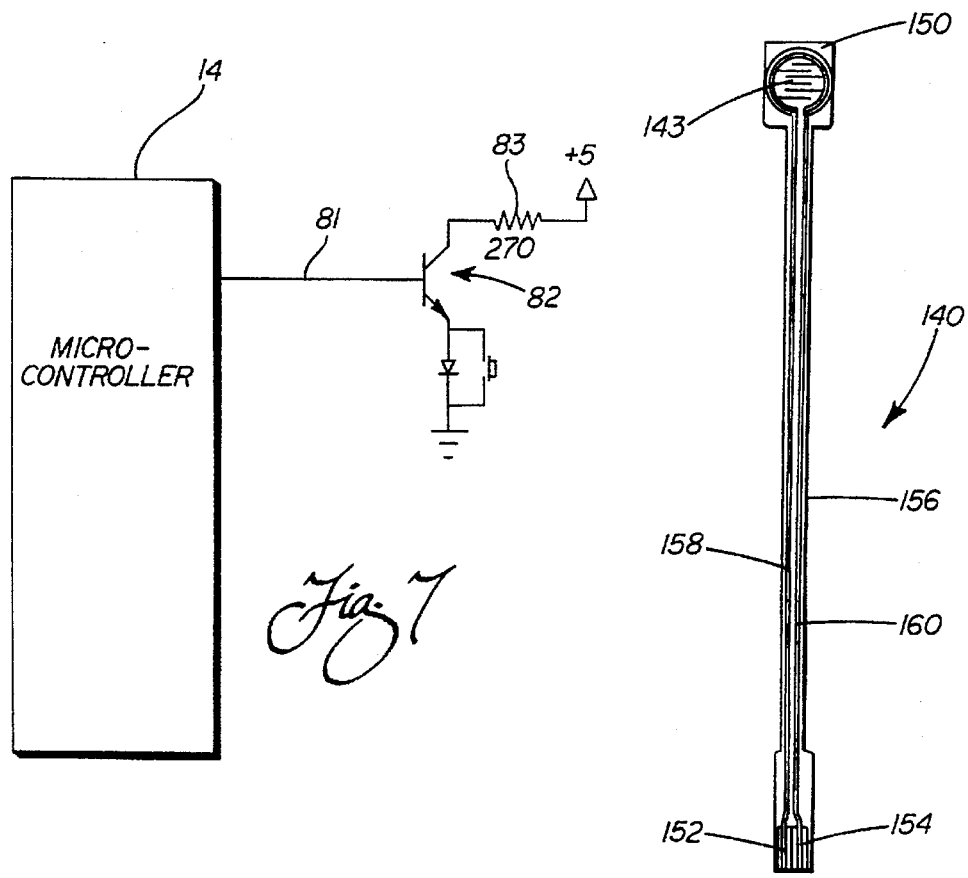

SWITCHING NETWORK FOR SELECTIVE PRODUCT DEMONSTRATION

This is a continuation of application Ser. No. 08/176,152, filed Dec. 30, 1993, now abandoned, which is a continuation in part of application Ser. No. 07/783,849, filed Oct. 29, 1991, now abandoned.

TECHNICAL FIELD

The present invention relates generally to retail selling of consumer electronics and, more particularly, to an advanced switching network for interconnecting selected products of different electronic product groups on display to allow active demonstration.

BACKGROUND OF THE INVENTION

Retailers largely rely upon active demonstrations to present electronic consumer products and, particularly, audio and video entertainment products to customers. Such active demonstrations allow the customers to explore product features, directly compare products and match customer needs and desires with the available products. Accordingly, active demonstrations are very effective in facilitating sales of consumer electronic products.

Presently, there are two standard types of product demonstration switchers. The first is the master control panel type. This type of switcher has displays and controls on a single, localized panel and is best suited for demonstration by a sales person. The displays on this type of product demonstration switcher typically include the current product selections and the system configuration, that is, how current selections are interconnected. The displays may also include prices and product installation information.

The controls of the master control panel type of product demonstration switcher allow one to select particular products for demonstration. Additionally, the controls typically allow individual product comparisons as well as system or group product comparisons. An input means is often provided for entering product brands, model numbers, prices, installation information, etc. into the system. In advanced systems, provision may also be made for the transfer of information to the store point-of-sale system or electronic cash register for use in transacting any sale.

The major drawback to this type of demonstration switcher is that it is not amenable to direct operation by customers without supervision from sales personnel. Many customers find this limitation inconvenient and annoying. Some may even choose to do their shopping at competing retailers that have a demonstration switcher more adapted to their direct control (i.e. a button-per-product type demonstration switcher; see below).

The second type of demonstration switcher may be called the "button-per-product" type. Demonstration switchers of this type are better understood and adapted for self-service by customers. A typical system includes a pushbutton selector and an indicator light adjacent to each product. Illumination of the light indicates that that particular product is presently selected and being demonstrated.

Conventional button-per-product type switchers have certain advantages to the retailer over the master control panel type switchers. More particularly, the capacity of button-per-product type switchers may be exactly tailored to the size of the display and the type of merchandise being sold. The system may be expanded at will in small increments so as to minimize capital investment, yet allow the necessary flexibility for the retailer to increase its product lines. Further, customers are encouraged to help themselves, thereby placing less burden upon the sales staff. Additionally, since there is no central control panel little dedicated space is required and, accordingly, more product display space is available.

Conventional button-per product type switchers do, however, suffer some disadvantages. They are not as powerful as master control panel type switchers. This leads to significant shortcomings in this type of switcher system. More particularly, conventional button-per-product type switchers cannot preselect systems or products. They also cannot preselect two products to allow instantaneous or A/B comparison. This can be particularly frustrating for a consumer ready to make a significant investment in electronic products but having difficulty choosing between the products.

Further disadvantages of conventional button-per-product type switchers include an inability to communicate with external databases or displays. Further, in large displays, there is no convenient access to distant products. Often the customer wishes to compare products that are out of reach and may, in fact, be across a listening room. Button-per-product type switchers also do not allow wireless remote control.

From a review of the above, it should be appreciated that neither conventional master control panel type switchers nor conventional button-per-product type switchers provide all the answers to the various needs of the retailer selling electronic products. The master control panel type switcher has certain advantages not characteristic of button-per-product switchers and vice versa. A need is therefore identified for a switching network marrying the desirable and essential characteristics of master control panel and button-per-product type switchers so as to provide enhanced versatility and better meet the needs of retailers and customers alike.

SUMMARY OF THE INVENTION

Accordingly, a primary object of the present invention is to provide a switching system or network for the interconnection and active demonstration of consumer electronic products overcoming the above-described limitations and disadvantages of the prior art.

Another object of the present invention is to provide a switching network that is more powerful and incorporates more flexible architecture to allow a greater choice of product demonstration modes and operational features and thereby enhances the ability to sell retail electronic products.

Still another object of the invention is to provide a switching network marrying the best characteristics of conventional master control panel and button-per-product type demonstration switchers without compromising any performance to thereby enhance overall consumer appeal and satisfaction. Additionally, the network also allows instantaneous comparison of electronic products to aid a customer in making a selection and, thereby, aid the retailer in making a sale.

A further object of the present invention is to provide a switching network with novel performance features including: an advanced noise suppression system combining "source mute" and "speaker deselection" methodologies; multiple speaker selection ability to allow simultaneous demonstration of two or more speaker pairs; an advanced circuit for achieving both push-button input and operations status indication through a single pair of conductors; automatic volume calibration so that different product combinations may be compared instantaneously at identical volume levels; automatic sound pressure limiting so that annoying sudden bursts of loud music are eliminated; and a built-in mechanism for indicating unauthorized disconnection of a product from the switching network so as to deter product theft.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a new, improved switching network is provided for interconnecting selected products of different electronic product groups on display. Advantageously, the switching network allows a multi-product system to be established for active demonstration of the selected electronic products with a flexibility of operation heretofore unavailable to retailers of those products.

The switching network described in this document is an alternative embodiment to that described in U.S. patent application Ser. No. 07/783,849, filed Oct. 29, 1991 and entitled "Apparatus and Method for Interconnecting Electronic Products", the full disclosure of which is incorporated herein by reference.

The switching network includes a plurality of nodes. Each product on display is operatively connected to one node. The switching network also includes a control means for supervising all network functions. The control means includes a microcontroller for each node to thereby take functional advantage of a distributed intelligence architecture. More specifically, each microcontroller utilizes an identical software program so that the microcontrollers cooperate together to perform the operations required to achieve the selective interconnection and active demonstration of various products.

A bus operatively connects the microcontrollers, allowing the monitoring of the electronic products and the performance of audio diagnostic functions to confirm proper system operation as well as full two-way communication between the microcontrollers. Preferably, this communication is expressed in serial binary form. Serial binary data transfer simplifies overall bus system requirements so that a single line carries data bidirectionally between the node microcontrollers. In contrast, conventional communication systems require more complicated and expensive electrical circuitry with a resulting loss in reliablity. Practical parallel binary systems require six or more data conductors in the bus as well as dedicated decoder circuits at each product selector. Serial pulse train systems use a single conductor but require complex dedicated pulse train processors at each selector. Electrical interlock systems, typical state of the art button-per-product switches, use complex circuitry at each selector. In short, the present serial binary data transfer system represents a significant advance over these conventional systems.

Further, each of the plurality of nodes includes a product selector switch for selectively activating an adjacent product connected to the node. Each node is also provided with a unique address that identifies the node and, correspondingly, the electronic product or products connected to the node. No two addresses within any product group are identical. Each node also includes an indicator lamp. The illumination of this lamp indicates that the product on display adjacent the node and lamp is currently selected for operation. Additionally, each node includes a switching means, such as a relay, for selectively operatively connecting a product connected to the node to the bus for purposes of product demonstration.

Preferably, the switching network also includes an optional central control terminal that is operatively connected to the node microcontrollers through the bus. The control terminal includes product selector means, such as a keyboard, for selectively activating products connected to the nodes. Thus, through the product selector switches at the nodes and the keyboard at the control terminal, the electronic products may be selected, respectively, from a position adjacent each product on display or from a central location. Hence, the switching network is adapted for both self demonstration by customers, (selecting products through the product selector switches adjacent the products) or demonstration by a sales person (from the control terminal, such as, a central control console or even a hand-held remote control unit). This significantly increases the flexibility of the switching network to aid the retailer in completing the sales transaction.

More particularly, the flexibility of the present switching network allows the customer to explore the features and performance of various electronic products on his own if desired or when sales personnel are busy helping other customers. Additionally, the switching network allows sales personnel to advantageously control demonstrations when working with a customer one-on-one to make the direct product comparisons.

In accordance with a further aspect of the present invention the switching network also includes a means for suppression noise during switching from one product to another. More specifically, the noise suppression means includes a housekeeping node having a microcontroller operatively connected to the bus for two-way communication with the node microcontrollers and switch means (i.e. a muting switch) responsive to the housekeeping node microcontroller. The muting switch is operatively connected to the signal bus between products functioning as a source of an audio signal such as compact disc players and tape decks, and amplifiers for amplifying that signal. The muting switch functions to selectively interrupt and reestablish the audio signal pathway between the sources and amplifiers.

Additionally, the noise suppression means includes a means, such as a relay, for disconnecting any speaker operatively connected to an amplifier only after the source audio pathway is disconnected. This means further functions to reconnect a selected speaker to a selected amplifier only after a newly selected product is connected to the bus and only before the source audio pathway is reestablished. As will be described in greater detail below, this noise suppression system effectively functions to provide trouble-free operation over a extended service life while also eliminating substantially all switching noise including offset-induced switching noises.

In accordance with still another aspect of the present invention, the switching network of the present invention allows for the selecting of multiple pairs of speakers thereby allowing a retailer to display a mix of speakers including types that do not cover the entire audio frequency range such as are commonly sold in the car audio market. Advantageously, this important capability is provided without additional hardware investment. More specifically, because the distributed intelligence architecture of the node microcontrollers imposes few limits on the network's logical capacity, this unique capability is provided through the system software as stored on a read only memory integrated circuit that is part of each node microcontroller.

In accordance with still another aspect of the present invention the switching network includes circuit means for operatively connecting the indicator lamp and switching means of each node to the node microcontroller through only a single pair of conductors. Historically, the functions of accepting a push-button input and displaying a status of a single channel has been accomplished by a first pair of conductors for the switch contacts and a second pair of conductors for the indicator lamp. Through the utilization of a novel circuit the switching network of the present invention reduces the number of conductors required to a single pair. This serves to simplify the installation procedure thereby shortening installation time and reducing labor expense. Further, in large systems, there is a significant reduction in the amount of wire conductor required to complete the installation. This results in a significantly cleaner, tidier installation.

In accordance with still another aspect of the present invention, the switching network includes an automatic volume calibration means for equalizing the volume of an audio signal produced by different selected products being interconnected for demonstration. This is a particularly important feature for the retailer as a customer often wishes to compare two pairs of speakers by switching between them while playing selected musical material. In such a speaker demonstration environment, it has been found desirable to play all speakers at the same volume in order to eliminate bias on the part of the listener due to loudness since relative loudness is of secondary importance in the selection decision but yet very influential in the perception of speaker quality.

More specifically, the automatic volume calibration means includes a microphone for sensing the sound pressure level produced by a product during demonstration. Further, a means is provided for producing a pink noise calibration signal through each product to be calibrated so as to determine the relative sensitivity of each product of a particular group (i.e. speakers or amplifiers). Additionally, a means is provided for attenuating the sound pressure level of each product of the group so as to be equivalent to that produced by the least sensitive product of that group.

In accordance with yet another aspect of the present invention the switching network also includes a means for automatically limiting the sound pressure level produced by any of the products interconnected through the switching network for active demonstration. This allows the retailer to eliminate any sudden burst of loud music that might otherwise occur when a customer switches from one product to another where the switched to product has previously had the volume control set far above a comfortable listening level. Accordingly, the present system functions to eliminate sudden loud bursts that can damage displayed products, expecially speakers, and that might startle or disconcert customers and at least momentarily disrupt business.

Additionally, the switching network of the present invention may also include means for detecting the disconnection of any product from any node as well as means for signaling an alarm in response to detection of a disconnected product. Such a feature is of increasing importance to the retailer due to generally rising crime rates and the theft of products. Accordingly, the present switching network incorporates an integral theft detection system that employs each node microcontroller to sense and report when any product is disconnected from the node. Specifically, a transformer in conjunction with a sampling pulse is used to detect loss of continuity through the connecting cable of the product and its chassis.

In yet another aspect of the present invention a method is provided for suppressing noise generated when switching from demonstration of a first electronic audio product to a second electronic audio product. The electronic audio products are selected from groups generally consisting of sources, amplifiers and speakers. The method comprises the initial step of interrupting an audio pathway between the sources and amplifiers. Next is the disconnecting of any speaker operatively connected to an amplifier only after the source-to-amplifier audio pathway is interrupted. This is followed by the disconnecting of the first electronic audio product from the audio pathway. Next is the connecting of the second electronic audio product to the audio pathway. Then comes the reconnecting of a selected speaker to a selected amplifier before the audio pathway is reestablished followed by the reestablishing of the audio pathway between a selected source and the selected amplifier. Such a noise suppression method serves to essentially eliminate all switching noise while protecting switching relays from damage.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWING

The accompanying drawing incorporated in and forming a part of the specification, illustrates several aspects of the present invention and together with the description serves to explain the principles of the invention. In the drawing:

FIG. 6 is a schematical block diagram of the optional housekeeping node;

FIG. 7 is a detailed schematical block diagram of the wiring circuit showing two conductors connecting the node selector switch relay and indicator lamp to the node microcontroller;

FIG. 12 is a top plan view of a flexible circuit switch for detecting unauthorized removal of a face plate from a radio.

Reference will now be made in detail to the present preferred embodiment of the invention, an example of which is illustrated in the accompanying drawing.

DETAILED DESCRIPTION OF THE INVENTION

Figure 1:
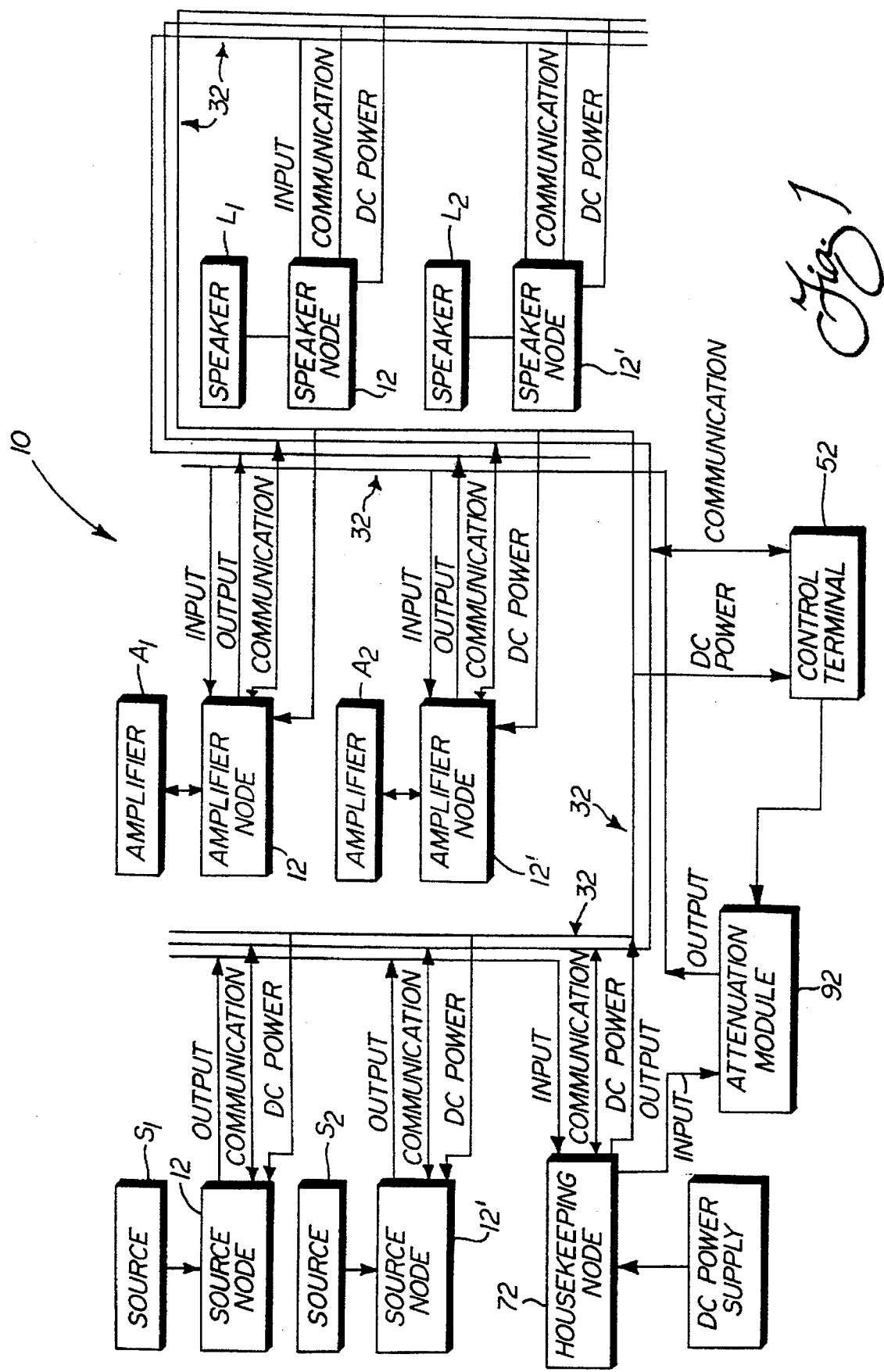
FIG. 1 is a simplified overview block diagram of the switching network of the present invention.

Reference is now made to the drawing Figures, and particularly, FIG. 1 schematically showing the switching network 10 of the present invention. The switching network 10 is described below with reference to the interconnecting of various electronic products for active demonstration of an automobile audio system. In particular, electronic products from various groups including a source group, an amplifier group and a speaker group are interconnected to form an automobile entertainment system that may be fully demonstrated and selectively compared with other products selected from these groups. It should be recognized that products from other groups may also be interconnected to form the entertainment system to be demonstrated. Such product groups could include equalizer, rear amplifier, rear speaker, sub-woofer amplifier and sub-woofer.

It should be further recognized that the present switching network is not limited in application to automobile audio systems but may be, in fact, adapted to other applications including but not limited to home hi-fi products such as digital disk players, tape recorders, stereo receivers, equalizers, speakers, etc. Interconnection of video products such as cameras, recorders, processors, monitors, etc. is also anticipated by the present invention. Similarly, home theater products that combine audio and video along with products such as movie sound processors and ambience processors could be demonstrated as well. Telephone, computer and home security products might also be interconnected utilizing this switching network. In fact, the present switching network 10 may be utilized to interconnect virtually any electronic product likely to be displayed and/or interconnected with related products in a retail store.

As best shown in FIG. 1, the switching network 10 includes a plurality of nodes generally designated by reference numeral 12 and described in greater detail below. Preferably, from 1-4 products from each product group are connected to each node but nodes may be defined to service any number of products. For purposes of simplicity, one product is shown connected to each node 12 in FIG. 1. Accordingly, one source $S_1$ (e.g. CD player or tape deck) is connected to a first source node 12 and a second source $S_2$ is connected to a second source node 12'. Similarly, amplifiers $A_1$ and $A_2$ are connected to first and second amplifier nodes 12, 12' and speakers $L_1$ and $L_2$ are connected to a pair of speaker nodes 12, 12'. The total number of sources, amplifiers, and speakers that may be interconnected into the system through the source, amplifier and speaker nodes 12 is essentially unlimited but for practical purposes may be up to 99. For purposes of illustration, only two of each product group is shown in FIG. 1.

Figure 3:
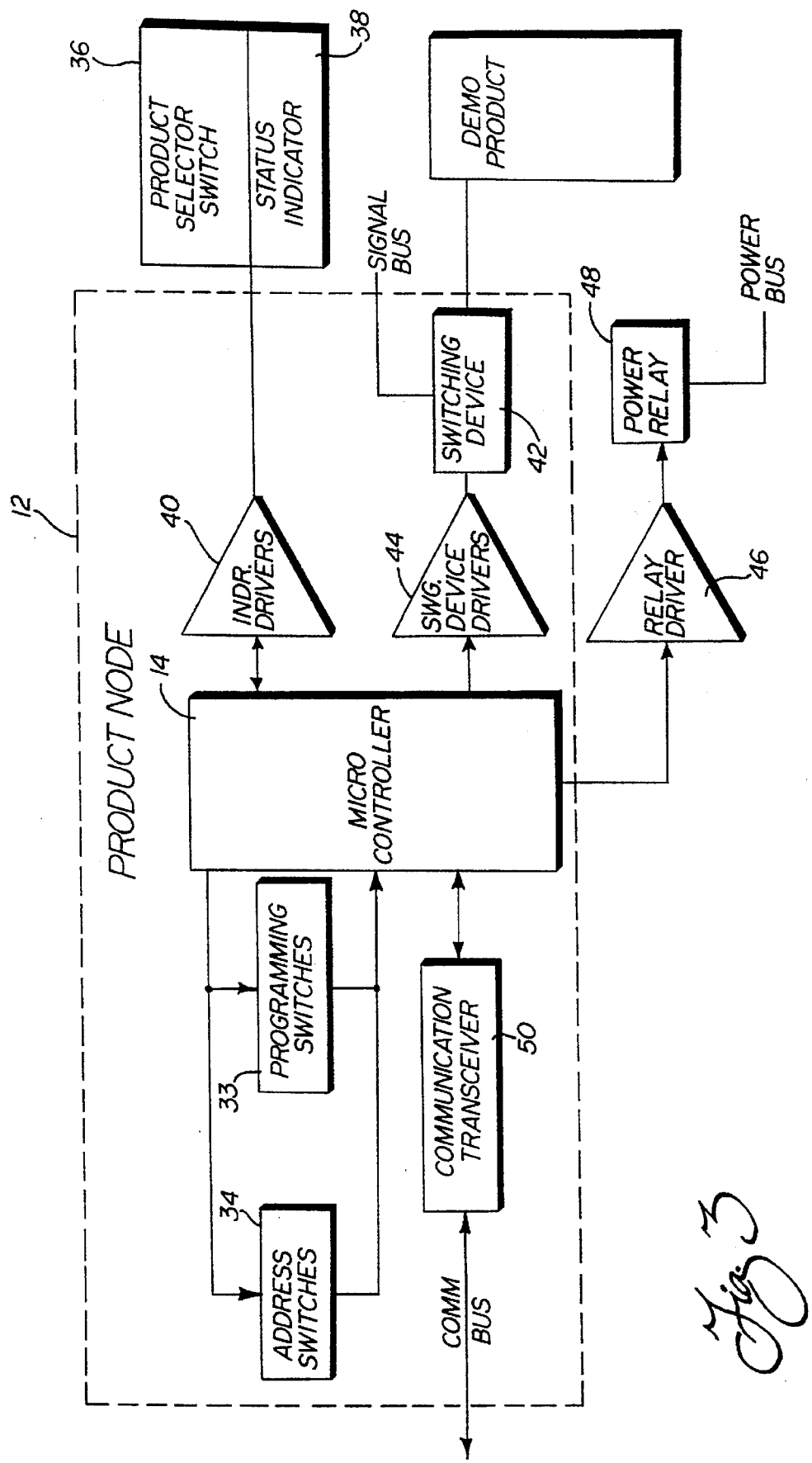
FIG. 3 is a simplified block diagram detailing a node.

As best shown with reference to FIG. 3, each product node 12 includes a microcontroller 14. The microcontroller 14 may, for example, be a type 80C52 unit including appropriate software support defining the logic of the switching system network as a whole stored in an internal program memory ROM 16. Such a microcontroller with internal read only memory integrated circuit is provided by Audio Authority part no. 123-008 available from Audio Authority Corporation, Lexington, Ky.

Figure 2:
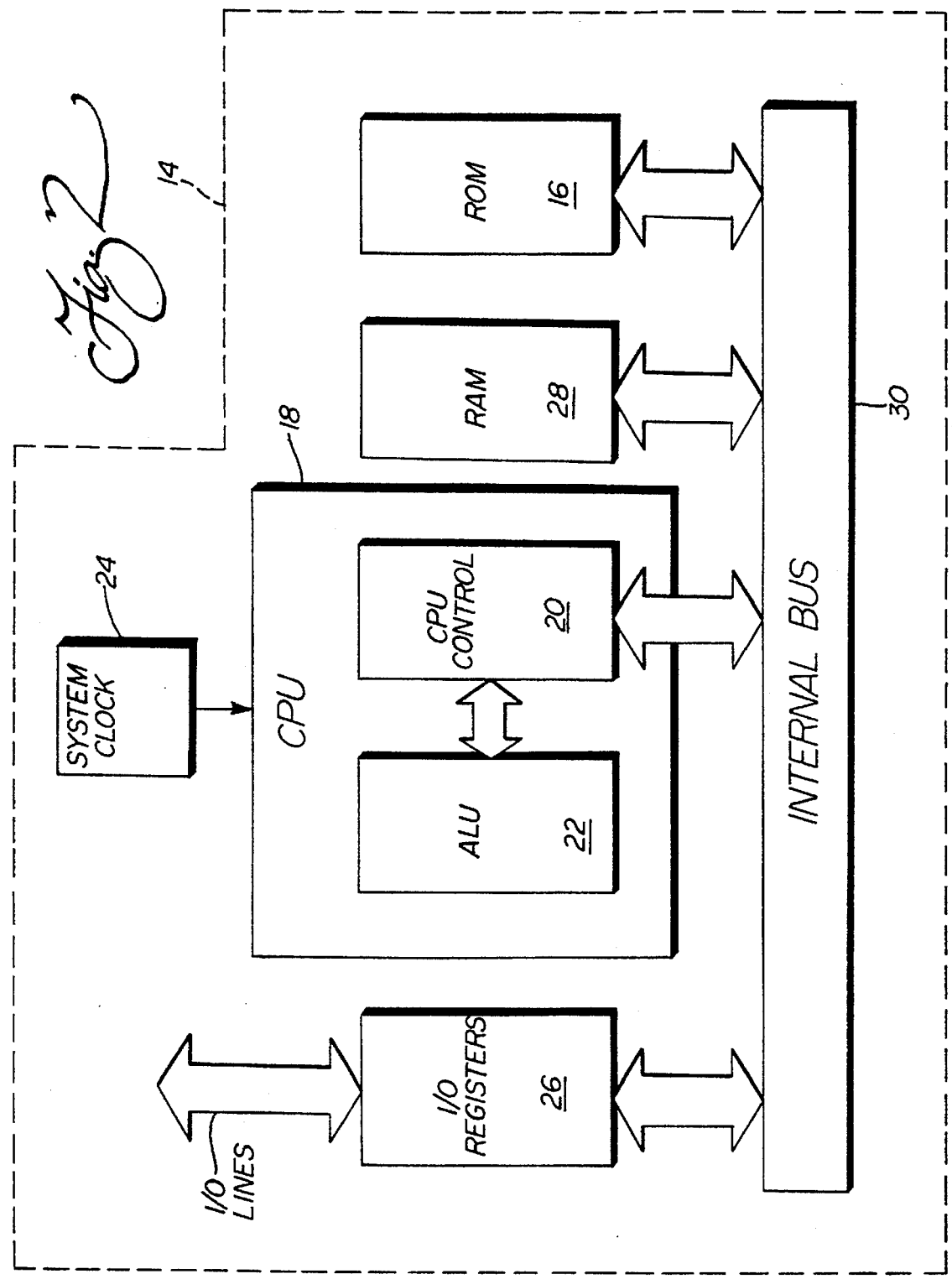
FIG. 2 is a simplified block diagram detailing one of the node microcontrollers provided at each node in the switching network shown in FIG. 1.

As best shown in FIG. 2 and known in the art, the node microcontroller 14 includes a central processing unit or CPU 18 having a CPU control 20 to supervise operation and an arthimatic logic unit or ALU 22 for mathematical and logic functions. A system clock 24 operatively connected to the central processor unit 18 synchronizes all operations.

The node microcontroller 14 also includes input and output registers 26 to send and receive data, the read only memory or ROM 16 for program storage, and random access memory or RAM 28 for temporary data storage. The system clock 24, ROM 16 and RAM 28 may be physically inside or outside the node microcontroller integrated circuit. An internal bus 30 allows communication between the various components of the node microcontroller 14.

A bus means 32 provides all signal paths to and from the nodes 12. In the explemary system being described this includes audio signal lines for product input and output, DC power lines for supplying power to products that require it and to the node microcontrollers 14 and data lines for two-way communication between the node microcontrollers. Accordingly, installation of the switching network 10 is simplified. Except for the cutting of the display panels, no tools or special skills are required. Each of the nodes 12 is simply interconnected by a single bus 32 that runs through multiple product selection sites without interruption. As a result of this design, faster, easier installation is provided with the highest interconnection reliability available.

Diagnostics enable detection of product hook-up and system interconnect problems so that the installer may quickly check a system and isolate erroneous wiring, dead products, and even the unlikely instance of faulty switching network nodes 12. Repair of faulty nodes 12 is a simple plug-in replacement.

Reference is now again made to FIG. 3 showing in detail one product node 12. This node 12 is representative of all the nodes interconnected to the bus 32. As shown, the node 12 includes the node microcontroller 14 previously described. Complex electrical circuitry is replaced in the present system through the utilization of the node microcontroller 14.

Each node 12 includes a programming switch 33 that allows the node microcontroller 14 to be programmed to perform specific functions thereby offering the retailer a choice of optional features.

Each node 12 also includes a series of address switches 34. The address switches 34 are particularly adapted for manually setting a unique address that is utilized to uniquely identify the particular node 12 and connected electronic product or products so as to allow the operation of the present switching network 10.

Each source node 12 also includes a cooperating product selector switch in the form of a selector button 36. One button 36 is provided for each product connected to the node 12. Again, for purposes of simplification only one product is shown connected to the node 12. It should be recognized, however, that four or more products may be connected to each node and, accordingly, up to four selector buttons 36 may be provided.

When activated, the selector button 36 allows the customer to select the electronic product, such as source $S_1$, amplifier $A_2$, or speaker $L_1$ for demonstration. The selection of the product is indicated by a selector/status indicator 38 (e.g. lamp or light-emitting diode) actuated by the associated node microcontroller 14 through the indicator driver 40. Illumination of the lamp 38 indicates that the electronic product connected to the node 12 in question, is interconnected and actively being demonstrated. One indicator lamp 40 is provided for each product connected to the node 12.

Each node 12 also includes a switching device 42, such as relays or other switching devices known in the art. The switching device 42 is actuated by the associated node microcontroller 12 through the switching device driver 44. The switching device 42 operatively connects the input and/or output of the electronic product connected to the node 12 with the audio signal line of the bus 32 so that the product (e.g. $S_1$, $S_2$, $A_1$, $A_2$, $L_1$, $L_2$) may be demonstrated. As should be appreciated, the selector button 36, indicator lamp 38 and switching device 42 all operate in response to the cooperating node microcontroller 14. As further described in detail below, each node microcontroller 12 is in operative communication with all other node microcontrollers through the data line of the bus 32.

Each node 12 also includes an additional relay driver 46 and a power relay 48. Under the supervision of the node microcontroller 14, these additional components allow power to be selectively applied to the products requiring power (e.g. sources and amplifiers).

Each node microcontroller 14 also includes a communication transceiver 50 connected to the data communication line of bus 32. The transceiver 50 allows for two-way communication along the bus 32 between each microcontroller 14 and the other microcontrollers connected thereto.

Figure 4:
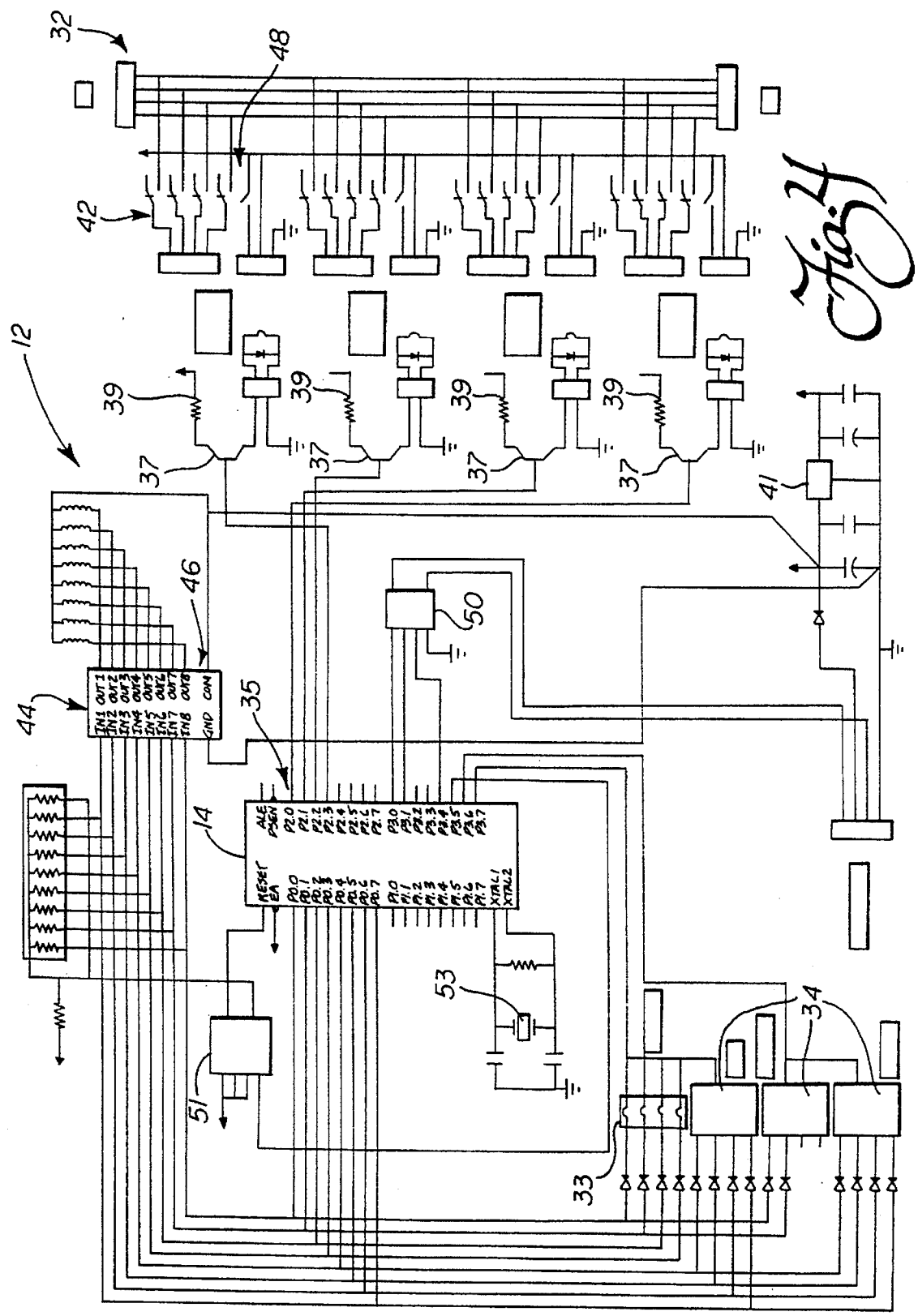
FIG. 4 is a product node schematic diagram.

The specific circuitry of a product node 12 as just described is shown in FIG. 4. The four 8-bit input/output ports 35 of microcontroller 14 are functionally organized as follows:

1.) Port 0 is addressing/programming switch data input and relay drive output;

2.) Port 1 is reserved for additional functions;

3.) Port 2 is selector input and status indicator output; and

4.) Port 3 is serial bidirectional communication and addressing/programming switch multiplexer.

Ports 0 and 2 each perform dual roles. Data from the addressing switches 34 and programming switch 33 are read into port 0 during the boot-up procedure in response to strobes written on port 3. After boot-up port 0 writes relay drive outputs through audio signal switching device driver 44 and relays 42 and power signal relay driver 46 and power relays 48. Status indicator outputs from port 2 are used to develop drive currents for the four status lamps 38 via transistors 37 and resistors 39, but the status output data is also multiplexed with the selector input data. Five-volt power for the logic devices is furnished by voltage regulator 41; serial communication is directed through transceiver 50. A watchdog timer 51, restarts the microcontroller 14 if the five-volt power should fail or if the program should halt unrecoverably for any reason. Crystal 53 is the frequency-determining element for the microcontroller's clock oscillator.

Figure 5:
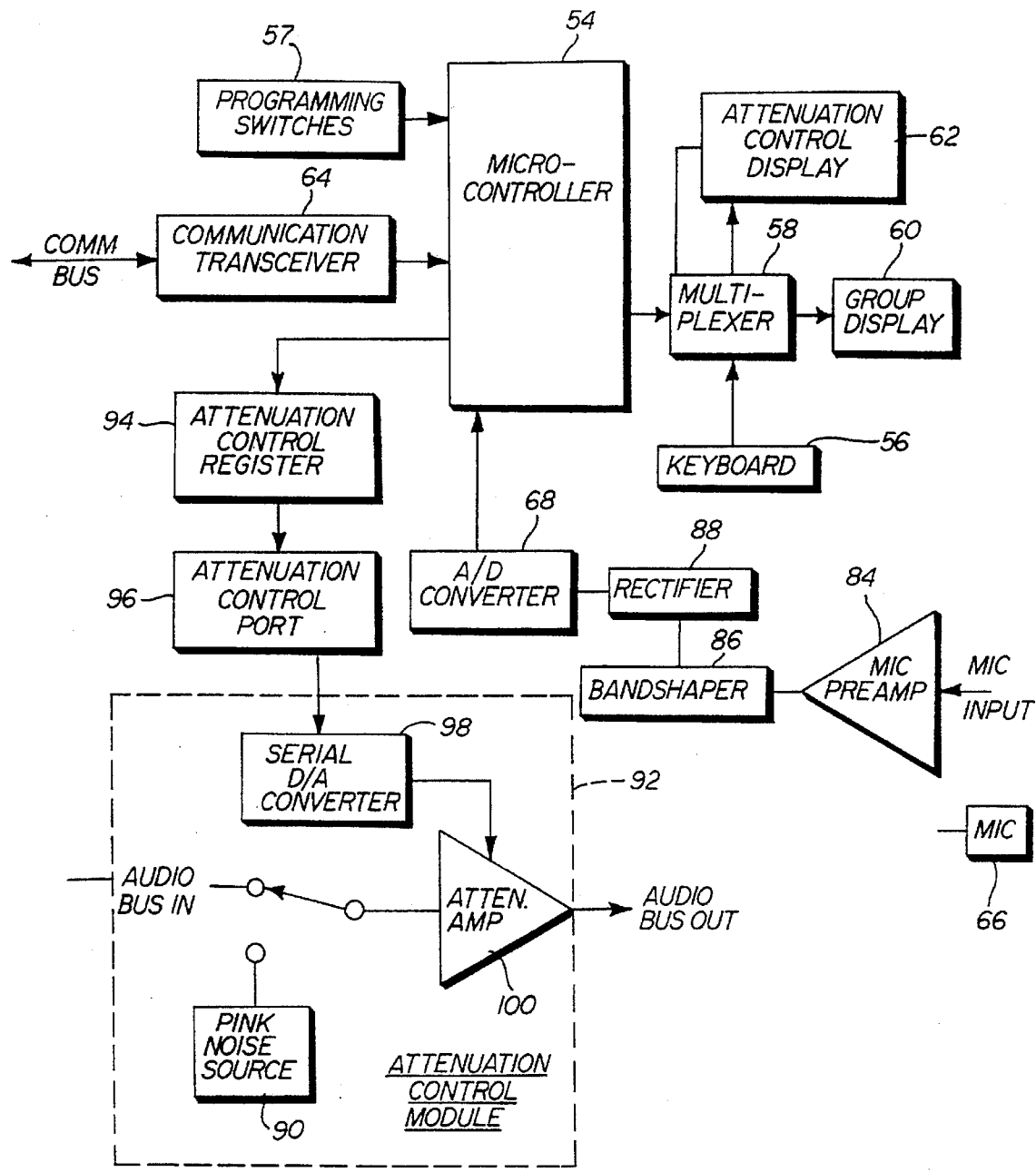
FIG. 5 is a schematical block diagram of the optional control terminal shown in FIG. 1.

Preferably, the switching network 10 also includes an optional control terminal 52 that may, for example, take the form of a dedicated control console. Control terminal 52 is operatively connected to the bus 32. As shown in FIG. 5 the control terminal 52 includes a microcontroller 54 of type 64180 including an integrated EPROM of type 27C256, Audio Authority part nos. 123-012 and 123-013 respectively. The program for the control terminal 52 is of a more comprehensive nature than that of the microcontrollers 14 of the product nodes 12. Programming switches 57 allows the microcontroller 54 to be programmed to perform the necessary functions for proper network operation.

The control terminal 52 further includes a keyboard 56 including function keys that allow quick access to products in desired groupings. Further, the microcontroller 54 and keyboard 56 function through a multiplexer 58 to control the operation of a display 60 that indicates the products in any particular group being demonstrated and, optionally an attenuation control display 62 providing a representative indication of the responsiveness or sensitivity of a particular amplifier and speaker combination being demonstrated.

As further shown in FIG. 5, the control terminal 52 in the basic system includes a communications transceiver 64 that operatively connects the microcontroller 54 of the control terminal 52 to allow two-way communication on the communication line of the bus 32.

The method of operation of the basic switching network 10 of the present invention will now be described in detail with reference to the drawing Figures. As described, the main functional entities in the present invention, the product nodes 12 and control terminal 52, reside on a common communications bus 32 which enables data to be shared and system functions to be coordinated without need of any central controller logic. Product nodes 12 may be connected into the switching network 10 according to the retailer's demonstration application. The combination of product nodes 12 utilized perform a number of essential functions through the coordinated operation of the node microcontrollers 14. Specifically, the microcontrollers 14: (1) interpret inputs from the product selector switches 36 and rationalize these inputs into a sequence of switching events; (2) interconnect desired products (e.g. $S_2$, $A_1$ and $L_2$) for demonstration by selectively energizing switching devices 42, such as relays, that are organized into logical groups, connected by the signal line of bus 32; (3) display the operational status of the switching network 10 through indicator lamps 38 associated with the products and product selector switches 36; and (4) receive control inputs from the control terminal 52 and send status information back to the control terminal.

These essential functions are carried out utilizing a scheme of self-coordinating activities shared by the node microcontrollers 14 each using an identical software program uniquely adapted for this purpose. Thus, each node microcontroller 14, when electrically coupled to all the other node microcontrollers by the communication line of bus 32, cooperatively performs the operations required to achieve the switching sequence determined from the immediate operator input and performs these operations in the proper order.

To accept input from the local product selector switches 36, the node microcontroller 14 scans the product selector switches 36 connected to it (up to 4 as shown in the schematic diagram of FIG. 4) under direction of a supervisory software loop that executes over and over again. When a microcontroller 14 senses a push-button switch 36 being pressed, it stores the address of the product to be connected for demonstration and seizes control of the communication line of the bus 32. The microcontroller 14 then transmits the address of the new product selection. Next, the selecting node microcontroller deselects any currently active product switching device 42 on the local node 12 and extinguishes the appropriate indicator lamp 38. Then all other node microcontrollers 12 that are identified within the same product group deselect any currently active product devices 42 and extinguish the corresponding status lamps 38. The selecting node microcontroller 14 then activates the switching device 42 to operatively connect the selected product to the audio signal line of bus 32 and illuminates the corresponding status lamp 38. The controlling node microcontroller 14 then releases the communications line of the bus 32 and resumes its supervisory routine.

These steps represent the essence of a product transfer and are carried out in accordance with the instructions stored in the programs of all the node microcontrollers 14 simultaneously. During the transfer sequence just described, selecting node microcontroller 14 runs the software routine that seizes the bus 32, transmits the new product address, deselects any resident active product, etc. as described. Meanwhile the remaining nodes 12 as a part of the supervisory routine are monitoring the communication line of the bus 32 for messages. When the message identifying the new product selection is received, each node 12 determines from the content of the message whether or not the message pertains to its product group. If it does, the node 12 stops its supervisory routine and starts a product transfer routine.

During the product transfer routine the node 12 performs the step of cancelling all current product selections and extinguishing all appropriate status lamps 38. Next, the node 12 determines if the new product address transmitted from the selecting node 12 is within the range of product addresses it represents. If a node does represent the new product address, after a delay period it activates the switching device 42 of that address and illuminates the corresponding status lamp 38. Then, the node microprocessor 14 resumes the supervisory routine.

The supervisory routine, besides scanning product selector switches 36 and monitoring the communications line of the bus 32, periodically writes a pulse to a watchdog timer 51. In this way, should the microcontroller accidentally enter an unrecoverable state for any reason, the supervisory routine is suspended, the watch dog pulse output ceases, the predetermined watch dog time period elapses, and the timer forces a hardware reset of the microcontroller 14 to reboot the microcontroller 14 and restart the program.

Additional software routines perform boot-up and program initialization. The boot routine, which is stored in a ROM location separate from the application program, starts upon initial power-up, clears the internal registers 26, and RAM 28, configures the microcontroller's input and output ports and registers appropriately for the application program and then starts the application program at a specified point. In the present invention that point in the program is the initialization routine which tests all RAM 28 and ROM 16, reads the node's address and programming switches 33, 34 and starts the supervisory routine described earlier.

The optional control terminal 52, that resides on the communications line on the bus 32 along with the product nodes 12, utilizes a microcontroller 54 running a program of a more comprehensive nature than that of the node microcontrollers 14. The control terminal 52 performs a number of essential functions. The control terminal 52 receives input data such as product choices from the user through operation of the keyboard 56 and displays output data such as switching node status through the group display 60. Control terminal 52 also encodes user input data as strings of commands to be transmitted to the node microcontrollers 14 via the communications line of the bus 32. The control terminal 52 also regulates the volume matching of products within products groups and displays the room sound pressure level in a manner that will be described in greater detail below. Further the control terminal 52 prevents access by unauthorized users through a security facility that will also be described in greater detail below.

The basic operational concepts of the microcontroller 54 are the same as those of the node microcontrollers 14, that is, a program stored in ROM 16 includes a repetitively executed supervisory routine that calls various other routines to perform the specific tasks required for the need at hand.

The control terminal microprogram provides a number of essential functions. It controls the multiplexer 58 to multiplex the keyboard 56 and numeric displays 60, 62. It polls the product nodes 12 and stores a list of product groups. It assigns product groups to the product group numeric displays 60 and establishes volume compensation relationships among affected product groups (e.g. amplifiers and speakers). It displays product node status on the product group numeric displays 60. It translates keyboard input into ordered strings of product node commands. It stores systems of products at the user's command so as to allow a completely preselected system of products to be actuated for demonstration through a single keyboard function.

The control panel microprogram also measures sound pressure level in the room for sound pressure level display and product volume calibration in a manner that will be described in greater detail below. The control panel microprogram also manually and automatically calibrates volume levels of products and stores those calibration values also in a manner described below. Additionally, the control panel microprogram stores system parameters according to the retailer's application needs and prompts the operator for access codes and prevents access if correct codes are not returned.

Like the product node program, the control panel program relies on a supervisory routine which constantly repeats a series of steps to maintain a state of readiness to receive input from the communication line of the bus 32, scan the keyboard 56 for operator input, periodically refresh the data displayed on the numeric displays 60, 62 and capture sound pressure level data from a room microphone 66 via an analog-to-digital converter 68.

When a message is received on the communication line of the bus 32, a routine is started to read and store the message. The stored message is decoded and if a change in product node status is detected, the new numerical value reflecting the change is stored and subsequently used to update one or more of the appropriate product group numeric displays 60, 62.

When keyboard activity is detected, a routine is started that interprets the string of key presses and, depending upon the outcome of the interpretation, starts a routine that performs one of the following operations.

If a new product has been selected, the new product number is stored in the appropriate product group numeric display 60 and a routine is initiated to build a string of product node control messages that will effect the change in an orderly manner. Then a subsequent routine is started to transmit this message string to the product nodes 12.

If a system of products is to be defined by the operator, the list of products is stored so as to define the designated system.

If a system of products is to be recalled, a string of product node control messages is built that will deselect all products and select a new list of products in an orderly fashion. A subsequent routine is then started to transmit this message string to the product nodes 12. If a change is being requested in the operational state or configuration of the volume matching section described below, the new configuration is stored (muting level, product volume level) or a routine is called that performs the desired operation (automatic calibration, measurement of sound pressure level).

If a change in security code is requested, the new security code is stored.

Finally, if the interpreted meaning of a string of key presses requires the operator to return a security code, a routine is run to display the code prompt in the attenuation control display 62 and to capture and interpret the code returned by the operator in order to admit or deny the requested operation.

While the basic operational concepts of the control terminal microcontroller 54 are the same as those of the product node microcontroller 14, the desire for a responsive user interface that is not impeded by an operating system limited to one task at a time may dictate the need for a multitasking realtime operating system (MRTOS). An MRTOS would enable the control terminal 52 to receive user input and display user output while it is communicating with the product node microcontrollers 14 in either direction and while it is computing product selection and/or volume matching data. As such an MRTOS is a program that would direct the microcontroller 54 to manage control terminal operation by dividing the microcontroller's available resources among whichever routines were required by immediate control terminal requirements. It will be appreciated, thereby, that a multi-tasking operating system could be readily incorporated into the present invention.

Noise Suppression System

In accordance with a further aspect of the present invention, a means is provided for suppressing noise during switching from one product to another. The noise suppression means includes a housekeeping node 70 that is operatively connected to the bus 32 between the source and amplifier nodes 12. As shown in FIG. 6, the housekeeping node 70 physically resembles a product node 12 but performs a source audio mute function and potentially enables other functions (described below) that cannot be economically performed by either the products nodes 12 or the control terminal 52.

More particularly, the housekeeping node 70 includes a microcontroller 72 of a type 80C52 integrated circuit including a read only memory, Audio Authority part no. 123-008. The housekeeping node 70 further includes a muting switch 74 connected in the audio signal output line leading from all the source nodes 12 to all the amplifier nodes 12 (note source bus in and source bus out in FIG. 6). The switch 74 is actuated by the associated microcontroller 72 through the switch driver 76. As further shown, microcontroller 72 is connected to the product nodes 12 through the communication line of bus 32 by means of a communication transceiver 78 allowing for two-way communication. Programming switches 80 allow the user to select various operational features.

Noise suppression schemes known in the art work in one of two ways. In the first, the source output is muted during the signal switching period. In the second, the speaker is disconnected during that period.

In the first approach, the source signal is removed from all products. This does not completely solve the switching noise problem because of small input and output DC offsets often present in consumer grade products being demonstrated. These offsets may produce millivolts of pulse noise when an offending product located in the signal path after the source is switched.

In the second approach, a significant burden is placed upon the speaker switching device. Specifically, if a speaker relay is opened with full power applied, substantial arcing occurs which may unacceptably shorten the life of the relay or force the choice of a higher rated and more costly relay. This limitation is even more significant if it is desired, for acoustical reasons, to impose a short across the non-selected speakers in the demonstration room. In that case, the speaker's magnetic circuit can store enough energy to damage relay contacts even more seriously than from merely opening the speaker circuit.

Advantageously, the audio suppression scheme of the present invention effectively combines these two approaches for the first time to offer more benefits than either alternative taken separately. Specifically, by removing the audio signal prior to turning off the speaker the destructive energy from disconnecting the speaker is nearly zero and most of the energy stored in the speaker is safely returned to the power amplifier. Accordingly, the burden on the speaker relay is reduced thereby effectively increasing its service life. In addition, DC offsets may be ignored such that switching noise is completely eliminated.

Further, it should be appreciated that by employing a muting switch 74 in the audio path in accordance with the housekeeping node 70 being described, the audio signal may be muted for a desired interval without affecting any video signal produced by a source such as a video cassette recorder or laser disc player. Thus, it is now possible for the first time to avoid an unwanted dropout in the television picture when switching audio/video products.

The method of operation of the noise suppression system will now be described in detail. When a selector button 36 is depressed the associated node microcontroller 14 seizes the communication line of the bus 32 so that no other microcontroller may transmit until the bus has been released. The audio mute sequence is then initiated.

Specifically, microcontroller 72 opens muting switch 74 through switch driver 76 to interrupt the audio source path between the source and amplifier that up to that moment were being demonstrated. Next, microcontroller 76 sends a signal along the communication line of bus 32 to the microcontroller 14 associated with the speakers that up to the time of switching had been selected for demonstration. The speaker node microcontroller 14 receiving the communication opens the switching relay 42 through activation of the associated switching device driver 44. This serves to disconnect the speakers.

Next, the address of the newly selected product is broadcast by the associated microcontroller 14 and the previously selected product being demonstrated from that product group is disconnected from the signal line of the bus 32 by operation of the associated switching relay 42 through the switching device driver 44. The newly selected product is then connected to the signal line of the bus 32 by the associated microcontroller 14 through the relay driver by means of the switching relay 42 associated with the newly selected product. If the newly selected product was not a speaker pair, the speakers previously selected are then reconnected to the signal line of the bus 32 again by operation of the switching relay 42, switching device driver 44 and microcontroller 14 associated with those speakers. The audio source path is then reestablished or restored between the selected source and the selected amplifier by operation of the housekeeping node microcontroller 72 through the switch driver 76 and muting switch 74.

The ability of the present switching network 10 to switch products quietly is enhanced by both interrupting the audio path at the earliest point between the source and amplifier and disconnecting all speakers prior to changing any product selections. Then the speakers are reconnected and the source audio path is restored. In the context of a serial communication protocol, each of these events is marked by the transmission of a discrete message by the selecting node. The messages are passed in the prescribed sequence with the time spacing of the messages being selected to meet the requirements of a serial communication protocol and to allow time for the various actions to be completed. This is especially important if slow electromechanical devices such as relays are used for signal switching.

Multiple Speaker Selection

In past switching network designs no facility has existed for selecting two or more pairs of speakers from a given speaker product group for simultaneous demonstration. This capability is desirable and even required when the retailer is displaying a mix of speakers including types that do not cover the entire audio frequency range such as those commonly marketed for vehicle audio systems. In other words, two or more component speakers may need to be combined for a valid demonstration and this capability is provided by the switching network 10 of the present invention.

More specifically, this capability is provided without additional hardware investment. This is possible because the microcontroller architecture imposes few limits on the system's logical capacity. Specifically, the logic definition adopted for speakers in the present switching network 10 includes pressing the product selector buttons 36 or making an appropriate entry on the control terminal keyboard 56 to turn the selected product on and off. Further, the logic definition defines a "long press" of more than one-half second as an instruction to add that speaker to the speaker already selected. When two or more speakers are selected, any of them may be turned off by pressing their selector buttons 36.

Further, a user-defined limit is imposed on the number of speakers that may be selected at one time. This is done in order to protect system wiring and the power amplifier that drives the speakers from damage due to overload. Specifically, this is achieved by providing programming switches 80 on the housekeeping node that transmit the speaker limits selected by the user to all speaker nodes during the boot-up procedure.

On the optional control terminal 52, the same long-press syntax is employed such that having entered the desired speaker number, a long press on the group key adds a speaker number to the list of active speakers. Similarly, upon entering the number of a speaker that is playing, short pressing the group key deletes that speaker number from the list. The numbers of all active speakers in a group are displayed sequentially in the group numeric display 60.

Two-Wire Selector Switch and Indicator

In prior art systems the functions of accepting a push button input and displaying the status of a single channel has been accomplished by a pair of conductors for the switch contacts and a separate pair of conductors for the indicator lamp. In contrast, the present invention utilizes a novel circuit shown in FIG. 7 so that both of these functions may be accommodated with only two connecting wires. Although this approach would be problematic and uneconomical using simple digital logic devices, with a microcontroller 14 provided at each node it is a relatively simple matter to multiplex switch closure data with LED drive. Thus, as shown a single controller input/output line 81 both drives the base of amplifier transistor 82 and receives switch data back. Resistor 83 sets the operating current of the light emitting diode 38.

More specifically describing the method, when a logic "1" of five volts DC is written to its input/output line 81 by microcontroller 14, the transistor 82 is biased by an internal pull-up resistor in the microcontroller and the lamp 38 receives a current of about 10 milliamperes, determined by the 270 ohm resistor 83, causing the LED lamp to light. The LED lamp forward voltage of about 1.8 volts in series with the transistor emitter-base forward voltage of about 0.70 volts present a total of about 2.5 volts to the line. If this voltage is read as an input to microcontroller 14, it is taken as a logic "1" because 2.5 volts is greater than the logic threshold of about 1.0 volt for this type of microcontroller. However, when the push-button switch 36 is depressed and its contacts are closed, the LED lamp 38 extinguishes and, more importantly the voltage being read back by the microcontroller 14 now consists only of the emitter-base forward voltage of 0.70 volts. This is taken as a logic "0" as it is less than the threshold value of 1.0 volts. Thus, the microcontroller 14 interprets the state of the push-button switch 36 when the lamp 38 is lighted.

When the lamp 38 is not lighted, a logic "0" of 0 volts DC is written to the input/output line 81 and no data can be read back in. The microcontroller 14, however, by means of a timing loop in its program, periodically turns the lamp 38 on so very briefly as to be undetectable to the eye, but long enough to sense whether the push-button switch 36 is being depressed. Thus, the microcontroller 14 is able to correctly interpret the state of the push-button switch 36 whether the lamp 38 appears lighted or not.

Utilizing but two wires to connect both the push-button switches 36 and status indicator lamps 38 lowers the overall system cost by minimizing the amount of material required to link what is usually a large number of push-buttons and lamps to the network system 10. The only additional material required by this method is the transistor 82, a nominal cost item. Field installation labor is also saved by using small two-conductor cable with one plug to connect the switches 36 and indicator lamps 38 as an assembly versus the larger three or four conductor cable with one or two plugs required by conventional methods.

Automatic Volume Calibration

It is commonly practiced in the retail sales industry to compare pairs of speakers by switching between them (A/B comparing) while playing selected musical material. This allows the qualitative differences between the two pairs of speakers to be identified and evaluated by the listeners/retail customers. In such a speaker demonstration environment, it has been found desirable to play all speakers at the same volume in order to eliminate bias on the part of the listener due to loudness, since relative loudness is of secondary importance in the selection decision.

In the past, the two main approaches taken to equalize speaker volumes have been (1) to use a manual control to adjust the relative volume of the two pairs of speakers before doing an A/B comparison and (2) to preset all speaker volumes ahead of time, so that in theory, any two pairs of speakers can be selected for demonstration without any need for further adjustment. The former approach can be shown to be the more accurate method owing to the inevitable differences in frequency response between any two models of speaker and differences in spectral distribution of energy among different musical materials. The latter method is usually considered sufficiently accurate, however, and can be automated to advantage. However, no simple or effective automatic calibration system such as provided for in the present invention, has been devised to the present date.

FIG. 5 shows a system for providing a measurement capability that may be incorporated into the design of the control terminal 52. A small omni-directional microphone 66 is placed near the listening center of the demonstration room for the purpose of sensing sound pressure level (SPL). The microphone output is amplified by microphone preamp 84, processed by the band shaper 86 and rectifier 88, digitized by the analog/digital converter 68 and presented to the control terminal microcontroller 54 so that the relative sensitivity of each pair of speakers on display may be measured. The test signal for this purpose is pink noise, that is, broad band noise containing equal energy per unit band width supplied by a generator 90, built into the attenuation control module 92.

For purposes of illustration the attenuation control amplifier 100 depicted in FIG. 5 represents one pair of stereo attenuation control channels. This simplified system is being shown for purposes of illustration only and it should be appreciated that today's multi-channel music systems call for two, three or more pairs of channels. Accordingly, the control terminal 52 must separately address attenuation controls for as many pairs of music channels as are required by the scope of music systems being displayed.

Figure 8:
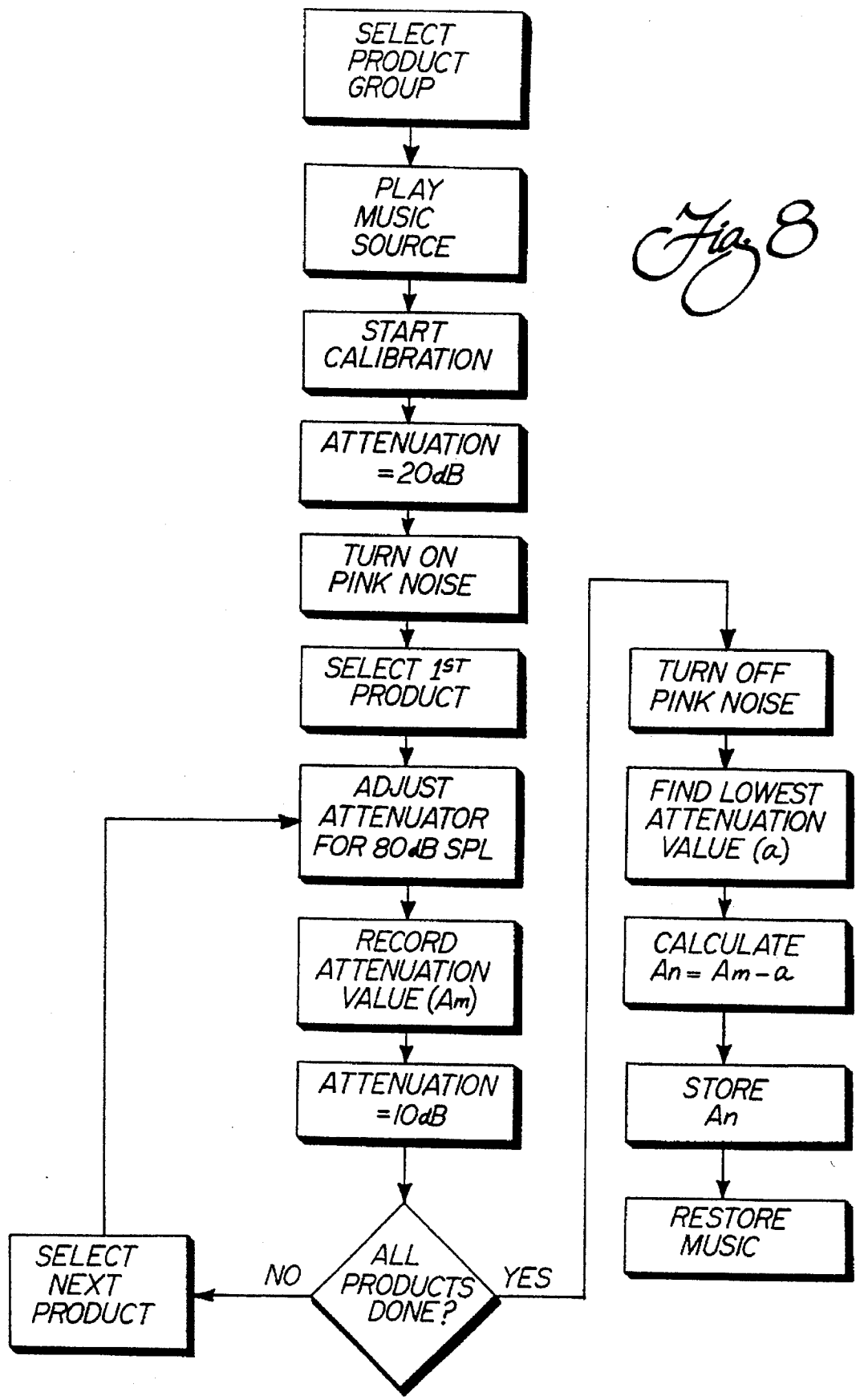
FIG. 8 is a flow chart schematically demonstrating the procedure for automatic volume calibration of the various products to be interconnected for demonstration.

The method of operation of the automatic volume calibration system of the present invention will now be described in detail. The specific procedure is summarized in the flow chart set forth in FIG. 8. First, the user selects a speaker group for calibration. Then the user selects and plays a music source at moderately high volume. The user then initiates the automatic calibration procedure by making the appropriate entry on the keyboard 56 of the control terminal 52. The attenuation amplifier 100 is automatically set for −20 dB to afford sufficient adjustment latitude for any probable range of speaker efficiencies. The user-selected source is then turned off and the pink noise source 90 is turned on. Speaker 1 is selected. The attenuation value is set so that the sound pressure level reads back at 80 dB SPL. The attenuation value for the speaker is then recorded.

Next the attenuation amplifier is set to −10 dB and the next speaker is selected. The attenuation value is set so that the sound pressure level again reads back at 80 dB SPL. The attenuation value for that speaker is then recorded and the attenuation value is then again set for −10 dB. The next speaker is then selected and the three attenuation steps are again repeated until all speakers have been measured. The pink noise source 90 is then turned off and the user-selected music source is restored. The speaker with the lowest stored attenuation value is selected as a reference and the attenuation value of the reference speaker is subtracted from all the speaker attenuation values and the resulting value per speaker is stored in memory. The reference speaker is then selected to play.

During the automatic speaker calibration procedure, the dwell time per speaker is chosen to give the user time to observe the process, even though the controller permits much more rapid execution. Also, the room sound pressure level is continuously displayed for visual verification. The procedure is monitored throughout and if any of the following errors are encountered, the procedure is terminated, the system is returned to its state just prior to initiation of automatic calibration and an error message is displayed on the attenuation control display 62. Specifically, the system monitors for disconnection of the microphone 66, and operability of the pink noise source 90 and the failure of the sound pressure level measurement to fall within an accepted range.

It should further be noted that the automatic volume calibration system may be equally applied to a group of power amplifiers associated with a group of speakers. It should be appreciated, however, that the automatic calibration will only be effective for power amplifiers without front-panel gain controls that might be tampered with and thereby nullify the calibration.

After calibration, whenever a calibrated speaker pair is selected for demonstration, its stored attenuation value is loaded by the microcontroller 54 into the attenuation control register 94. If the related amplifier group has been calibrated, the attenuation values of the amplifier and speaker are summed and loaded into the attenuation control register 94. The attenuation controller register 94 is connected by means of the attenuation control port 96 to the attenuation control module 92. A serial digital/analog converter 98 presents the analog equivalent of the digital attenuation value to the attenuation amplifier 100 connected in the audio signal line of the bus 32 output from the housekeeping node 70 so that the system being demonstrated performs at the desired volume level (i.e. the same for all systems) for best comparison.

It should be further appreciated that manual muting may be provided for the convenience of a sales person wishing to discuss matters with a customer. This is easily accomplished by adding a predetermined muting value, for example, 20 dB, to the attenuation value currently operative for each pair of channels. This is accomplished through manipulation of the keyboard 56.

Automatic Sound Pressure Level Limiting

A frequent complaint of audio retailers relates to sudden bursts of loud music coming from a sound room, whether or not the sound room is attended by a salesperson. It is all too easy to mistakenly select for play a receiver or amplifier where someone else has previously turned the volume control far above a comfortable listening level. The resulting loud sound startles or disconcerts everyone and momentarily disrupts business and can even result in speaker damage. The present invention is the first switching network to address this problem.

Specifically, the sound pressure level measurement and attenuation control loop described in the previous section of this document enables the desired control. More specifically, the control is provided through the microcontroller 54 of the control panel 52 functioning in accordance with its software program.

Specifically, during all normal operation, a sound pressure level detected by the microphone 66 that exceeds a threshold level selected by store personnel evokes a mute state, that is, 20 dB or any user-defined value is added to the current attenuation value for each pair of attenuation control channels. The mute state may be discontinued manually through appropriate entry made at the keyboard 56.

Theft Detection System

Continuing retail store inventory shrinkage rates point to the need for increased security of electronic display goods. While a number of security devices have been developed in the art that function separately from the demonstration switching network, the present invention incorporates the first integral theft detection capability in a switching network.

The means for detecting unauthorized disconnection of any product from any node 12 includes means for detecting a loss of a product at a node and means for signaling an alarm in response to detection of a disconnected product provided at the housekeeping node 70.

Figure 9A:
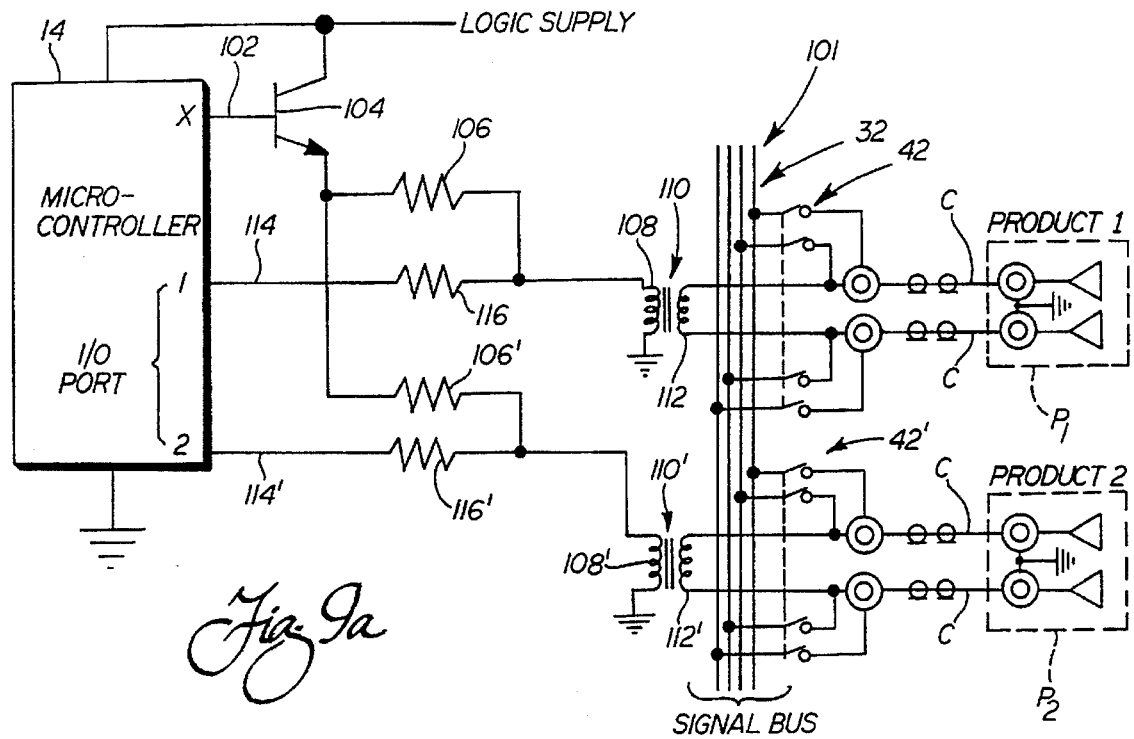
FIG. 9a and 9b are, respectively, schematical block diagrams of first and second embodiments of the optional theft detection system of the present invention.

FIG. 9a discloses one embodiment of a means 101 for detecting disconnection of a product at the product node 12 in the case of a product equipped with phono jack connecting means. In this Figure two audio products $P_1$, $P_2$ are shown connected by shielded cables to a product node 12. Specifically, the products $P_1$, $P_2$ are selectively connected to a signal line of a bus 32 by microcontroller 14 by operation of two product selection relays 42 in a manner already described.

The program stored in the microcontroller 14 directs the microcontroller to generate a pulse waveform on input/output line 102 that is current amplified by transistor 104. For product $P_1$, the voltage pulse present on the emitter of transistor 104 is current limited by resistor 106 and applied to the primary winding 108 of transformer 110. When product $P_1$ is connected to the node 12 through its connecting cables C, the conductive path through the shielded conductors of the cables C and the inherent circuit path connecting the left and right connector shells of the product phono jacks presents a low impedance to the secondary winding 112 of the pulse transformer 110. In this state, the pulse amplitude developed across the primary winding 108 of the transformer 110 is minimal, representing only the resistance of the connecting cable C and the ground circuit of product $P_1$, and the near-zero amplitude pulse presented to the input/output line 114 through protection resistor 116 is interpreted by the microcontroller 14 as a logical "0".

When product $P_1$ is disconnected, however, the open-circuited secondary winding 112 of the transformer 110 reflects a high impedance to its primary winding 108 and substantially all of the available voltage from the emitter of transistor 104 appears on the primary winding 108 of transformer 110. Therefore, when product $P_1$ is absent, the amplitude of the pulse presented to the input/output line 114 of the microcontroller 14 is interpreted as logical "1". Product $P_2$ is similarly sensed through the identical circuitry carrying the same reference numbers with a prime designation (e.g. 106', 108'). In fact, it should be appreciated that any number of products may be sensed in this way and monitored by a like number of microcontroller input/output lines. The repetition rate of the pulse wave form is chosen to prevent any appreciable delay in the response of the microcontroller-based circuits to product removal. The speed of even ordinary microcontrollers permits response times on the order of microseconds.

The required pulse wave form can be generated by a routine in the program software and output on an input/output line or an existing repetative microcontroller output signal such as address latch enable (ALE) may be used as a pulse source.

The use of transformers to isolate each product ground from the product module's ground is dictated by the necessity of avoiding ground loops, or circular ground paths which tend to induce unwanted noise in the audio path or to cause other circuit misbehavior. Thus, adding the theft sensing circuit of the present invention yields no undesirable side effects. It should be noted, however, that the theft sensing circuit is connected as directly as possible to the product. Nevertheless, in order to reliably sense the absence of a product, the switch relay 42 must be directed to disconnect the product from the signal line of the bus 32 to prevent a product at the other end of the bus from providing a false continuity path.

Figure 9B:
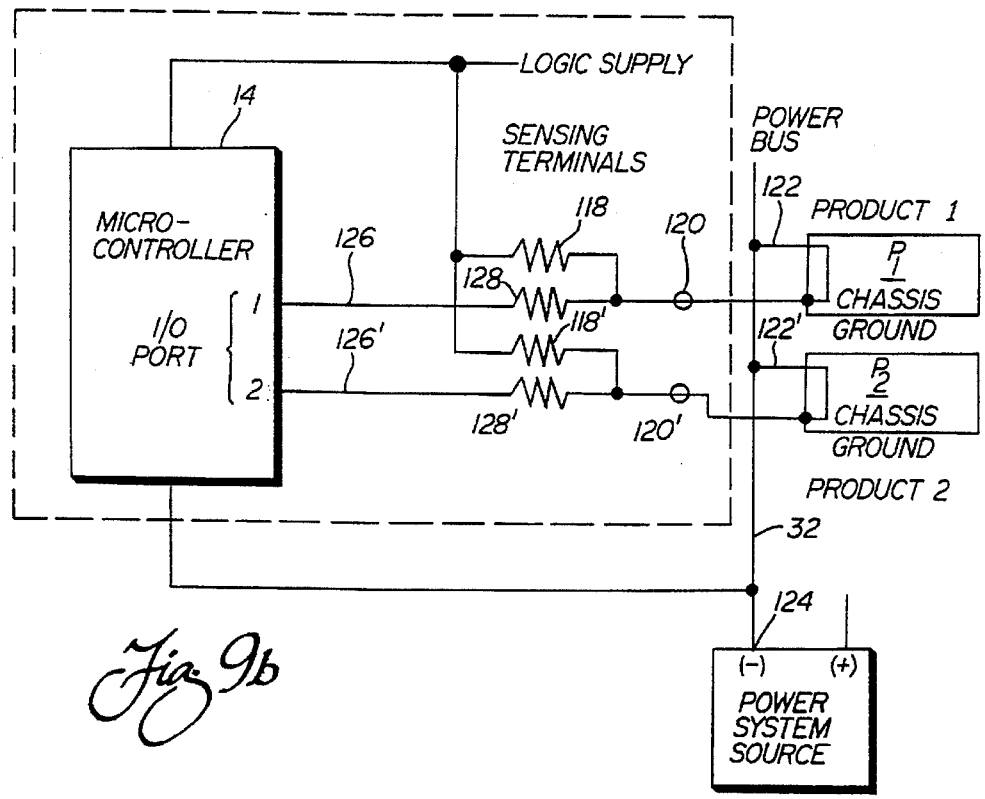

Some products, particularly in the car audio market, lack the phono jacks required by the pulse detection apparatus shown in FIG. 9a. Although some of these products could be sensed by appropriate connections to their screw terminal blocks, pin connectors, etc., a more general approach is to sense the connection between the chassis of this type of product and the common rail of the DC bus that provides operating power to the product. Thus, as shown in FIG. 9b, instead of a pulse waveform, continuous voltage from the logic power supply is current limited by resistors 118, 118' and sent out through product sensing terminals 120, 120' connected to the product chassis. The sensing current in each case flows through the inherent path from the product chassis to the DC power supply wire 122, 122' and then through the power line of the bus 32 to the DC power source negative terminal 124. When the product is present, the DC voltage value represented to the microcontroller input/output line 126, 126' through the protection resistors 128, 128' is nearly zero which is taken as a logic "0" by the microcontroller 14. When the product is absent, the voltage presented to the microcontroller 14 is nearly the entire logic supply voltage, which is taken as a logic "1". The alternate switch contact shown in FIG. 9b may be used to detect loss of non-electrical products or portions of products such as in the case of removable face plate car radios (see description below).

Figure 10:
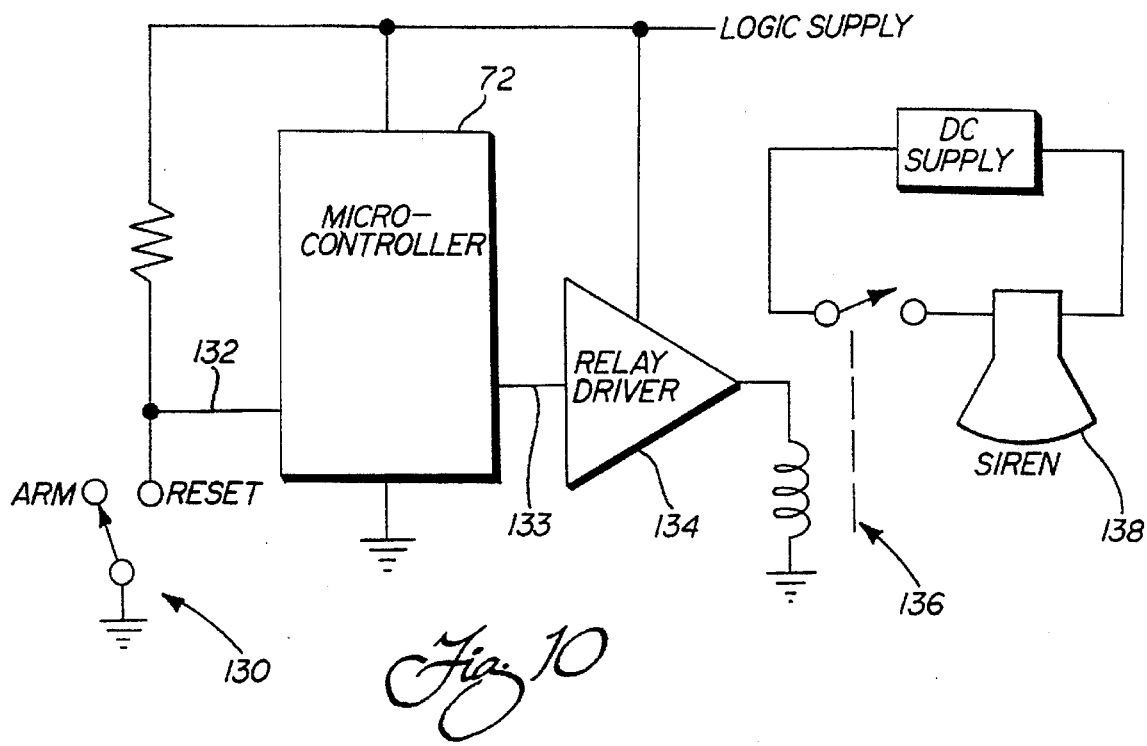
FIG. 10 is a schematical block diagram of the optional alarm subsystem of the theft detection systems shown in FIGS. 9a and 9b.

The microcontroller 72 in the housekeeping node 70 executes a different program than the microcontrollers of the product nodes 12 although it resides in the same ROM as the product node program. This is in keeping with the unique role of the housekeeping microcontroller 72 in the switching network. As shown in FIG. 10, the switch 130, labeled "arm/reset" is connected to one of the input/output lines 132 of the microcontroller 72. Another of the input/output lines 133 of the microcontroller 72 controls a relay driver 134 that activates an alarm relay 136.

While the system for detecting an unauthorized disconnection of a product from a node 12 described above relies upon imbedded microcontrollers for its operation, it should be appreciated that many other forms of digital logic or analog circuit topographies could be used to implement the described functions of pulse generation, detection and communication.

The foregoing describes an apparatus for detecting against loss of an electronic product from a retail display. The loss of car radio removable face plates, however, also poses a significant burden on retailers. However, neither the pulse-coupled nor static DC detection methods described above will detect the loss of a radio face plate if the radio chassis remains connected to the switching system with theft detection capability.

Figure 11:
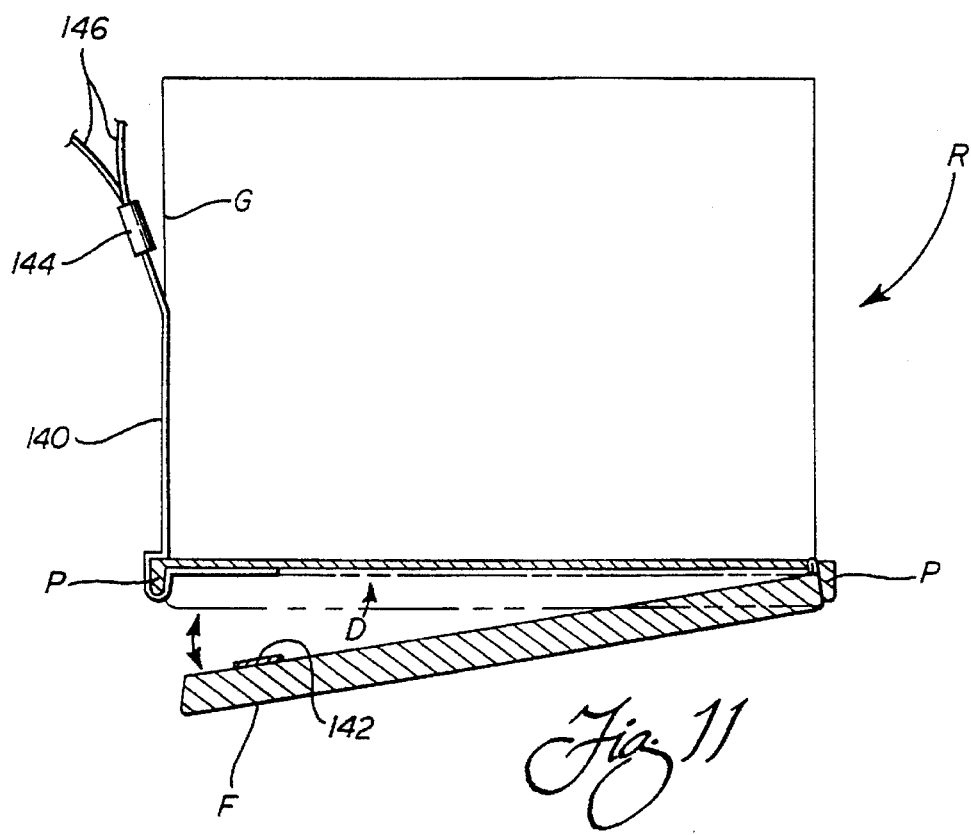
FIG. 11 is a schematical representation of a radio with removable face plate wired for purposes of theft detection in accordance with the present invention.

The mechanical configuration of removal face plate radios is shown in FIG. 11 where the face plate F is shown rotated out of its in-use position as if in the act of removal from the panel frame P of the radio R. Also shown is a feature of the present invention, a flexible printed circuit 140 that is adhered to the face plate cavity D, panel frame P and chassis G of the radio. A resilient conductive pad 142 applied to the opposing surface of the face plate F is positioned to make contact with and bridge the exposed contacts 143 of the flexible circuit 140 when the face plate F is in its in-use position, thereby forming an electrical switch connected to detection circuitry through socket connector 144 and cable conductors 146. This switch effectively closes the detection circuit when the face plate F is attached to the radio and opens it when the face plate is removed.

Such a normally-closed switch is easily integrated into the theft detection circuits previously described. Connecting the flexible printed circuit 140 to alternate security switch terminals (not shown) of a product switching module equipped with static DC product presence detection as shown in FIG. 9b allows the theft detector to sense loss of either the entire radio R or only the face plate F. In either case, the current loop, which now includes the flexible printed switch instead of the radio chassis, is opened upon removal of the radio or the face plate and the microcontroller 14 in the product node 12 begins the theft reporting process.

FIG. 12 shows a typical flexible circuit switch layout 140. The interdigitated contacts 143 assure multiple points of contact with the conductive pad 142 for high reliability. The opposite end of the printed circuit 140 is a pair of printed contacts 152, 154 to mate with the socket 144 connected by the cable 146 to detection terminals provided on the product node 12. A middle section 156 with a pair of printed conductors 158, 160 permits the socket contacts 152, 154 to be placed well away from the panel area and mounting means of the car radio. In this position, the contacts 152, 154 are easily accessed at installation but otherwise protected from tampering. Of course, it should be appreciated that many other types and styles of switches, contactors and conductors other than the flexible printed circuit 140 described can be arranged for the purposes of sensing the removal of car radio face plates F.

In accordance with the present method, data generated by sensing product removal must be processed in order to make sense of it for the retail operator. It is desirable, for instance, to enable authorized removals to take place for the purpose of product rotation, system reconfiguration, etc. Therefore, at least a minimal degree of user input must be accounted for when making decisions affecting the alarm output.

It would be impractical for the retail operator to have access to each and every product node 12 to disarm the system in order to make product changes. Accordingly, the opportunity is taken to employ the housekeeping microcontroller 72 as the point of control as well as the point of alarm output. Thus, when the switch 130 (note FIG. 10) is moved to the arm position, the housekeeping microcontroller 72 sends an arm message out on the communication line of bus 32. The node microcontrollers 14 are programmed to respond to this message by reading the logic states of their product sensing input/output lines 114, 114' in FIG. 9a and 126, 126' in FIG. 9b and storing these bits in RAM. These values are retained in memory until the next arm message is sent by the housekeeping microcontroller 72.

The node microcontrollers 14 periodically read the product sensing input/output port and subtract the corresponding bit previously stored in memory from each bit read from the sensing port. the result of this subtraction is "0" or "+1" for every bit, the node microcontroller infers that the products were undisturbed (when "0") or added to the display (when "+1") and it resumes its normal routine. If the result is "−1" for any bit, a product loss is inferred and the microcontroller 14 sends an alarm message along the communication line of the bus 32. The housekeeping microcontroller 72 responds to this message by writing a logic 1 to the alarm output line 133 (see FIG. 10) causing a relay driver 134 to drive relay 136 and sound an audible alarm such as siren 138 (shown) or other silent alarm(s) such as a flashing indicator lamp depending upon the preference of the retail operator. The alarm output line is held high until the arm/reset switch 130 is returned to the reset position.

In summary, numerous benefits result from employing the concepts of the present invention. By distributing most of the logic functions among the nodes 12 it is possible to eliminate the host microprocessor incorporated in, for example, the switching network disclosed in U.S. patent application Ser. No. 07/783,849, now abandoned. This makes small systems more cost-effective than before. An additional savings is enjoyed by increasing the capacity of the nodes 12 from 1–4 products. Further, switching noise is more effectively suppressed in the present invention owing to a more comprehensive switch sequencing method. Multiple speakers are able to be selected if desired by a simple action of the operator. The functions of switch sensing and lamp illumination are combined on a new two-wire connection to the lighted product selection pushbutton 36. The new control terminal 52 offers all the traditional functions with two new ones: elimination of the tedious manual volume adjustment by automatic volume calibration of sound pressure levels for all power amplifiers and speakers and protection against uncomfortable and potentially damaging high volume levels through automatic sound pressure limiting. Further, the present invention provides the first switching network 10 with an integrated product theft detection system.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A switching network for interconnecting selected products of different electronic product groups on display, comprising:

a plurality of nodes, each product on display being operatively connected to one node;

control means for supervising all network functions, said control means including a micro-controller for each node;

bus means for operatively connecting said microcontrollers for two-way intercommunication between said microcontrollers and said products on display for interconnection and active demonstration; and a product selector switch for each node for selectively activating an adjacent product connected to said node whereby interconnection and active demonstration of selected products is possible.

2. The switching network set forth in claim 1, including a control terminal operatively connected to said control means, said control terminal including product selector means for selectively activating products connected to said nodes from a remote location.

3. The switching network set forth in claim 2, wherein said control terminal further includes an automatic volume calibration means for equalizing the volume of an audio signal produced by different selected products being interconnected for demonstration.

4. The switching network set forth in claim 2, wherein said control terminal further includes means for automatically limiting sound pressure level produced by any of said products interconnected through said switching network for active demonstration.

5. The switching network set forth in claim 1, wherein said products include speakers and further including means for selecting multiple pairs of speakers for simultaneous demonstration.

6. The switching network set forth in claim 1, wherein each node further includes:

means for addressing said node to uniquely identify said node and the connected product within said switching network;

an indicator lamp, illumination of said indicator lamp indicating the selection status of the product connected to said node; and switching means for selectively operatively connecting said connected product to said bus means.

7. The switching network set forth in claim 6, further including circuit means for operatively connecting said indicator lamp and switching means to said microcontroller of said node by only a single pair of conductors.

8. The switching network set forth in claim 1, wherein multiple products are connected to each node.

9. The switching network set forth in claim 3, wherein said automatic volume calibration means of said control terminal includes:

a microphone for sensing sound pressure level produced by a product during demonstration wherein said product is selected from a group consisting of amplifiers and pairs of speakers;

means for individually producing a pink noise calibration signal using each selected product of said group connected to said switching network so as to determine the relative sensitivity of each product of said group; and means for attenuating the sound pressure level of each product of said group so as to be equivalent to that produced by the least sensitive product of said group, said means for producing a pink noise calibration signal and said means for attenuating the sound pressure level of each product being selectively operatively connected in an audio signal line of said bus means.

10. The switching network set forth in claim 9, wherein said central control terminal further includes means for automatically limiting sound pressure level produced by any of said products interconnected through said switching network for active demonstration.

* * * * *